United States Patent
Luttrell

(10) Patent No.: US 6,857,179 B2
(45) Date of Patent: Feb. 22, 2005

(54) METHOD FOR MAKING AN ELECTRIC MOTOR STATOR

(75) Inventor: Craig W. Luttrell, Loganville, GA (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 269 days.

(21) Appl. No.: 09/967,134

(22) Filed: Sep. 28, 2001

(65) Prior Publication Data

US 2003/0066182 A1 Apr. 10, 2003

(51) Int. Cl.⁷ .................. H02K 15/00; H02K 15/14; H02K 15/16
(52) U.S. Cl. .............. 29/596; 29/592.1; 29/602.1; 29/605; 29/606; 29/834; 310/179; 310/184; 310/208
(58) Field of Search .................. 29/592.1, 596, 29/602.1, 605, 606, 729, 834, 837; 310/179, 184, 208

(56) References Cited

U.S. PATENT DOCUMENTS

| | | | | |
|---|---|---|---|---|
| 3,201,627 A | * | 8/1965 | Harrington | 310/198 |
| 4,394,596 A | * | 7/1983 | Kimura et al. | 310/184 |
| 5,654,602 A | * | 8/1997 | Willyoung | 310/179 |
| 6,170,974 B1 | * | 1/2001 | Hyypio | 716/4 |
| 6,349,463 B1 | * | 2/2002 | Luttrell | 29/596 |
| 6,590,309 B2 | * | 7/2003 | Luttrell | 310/184 |

FOREIGN PATENT DOCUMENTS

JP 08065976 A * 3/1996 ........ H02K/19/28

OTHER PUBLICATIONS

"Apparatus for experimental simulation of magnetic flux and power loss distribution in a turbogenerator stator core"; Radley, G. Moses, A.; Magnetics, IEEE Transactions on, vol.: 17, Issue: 3, May 1981; pp. 1311–1316.*

* cited by examiner

Primary Examiner—A. Dexter Tugbang
Assistant Examiner—Paul D Kim
(74) Attorney, Agent, or Firm—Patrick S. Yoder; Alexander M. Gerasimow

(57) ABSTRACT

A technique for making a stator for an electric motor or similar machine includes disposing a plurality of concentric coils in a stator core such that leads exit both ends of the stator core. The coils are disposed in accordance with a winding pattern that is particularly suited for making four-pole, three-phase machines. Certain of the coils are disposed singularly within core slots, while other coils share slots with coils of other winding groups. The coils may be inserted by machine, and in several layers by rotating the stator core between each layer insertion.

18 Claims, 6 Drawing Sheets

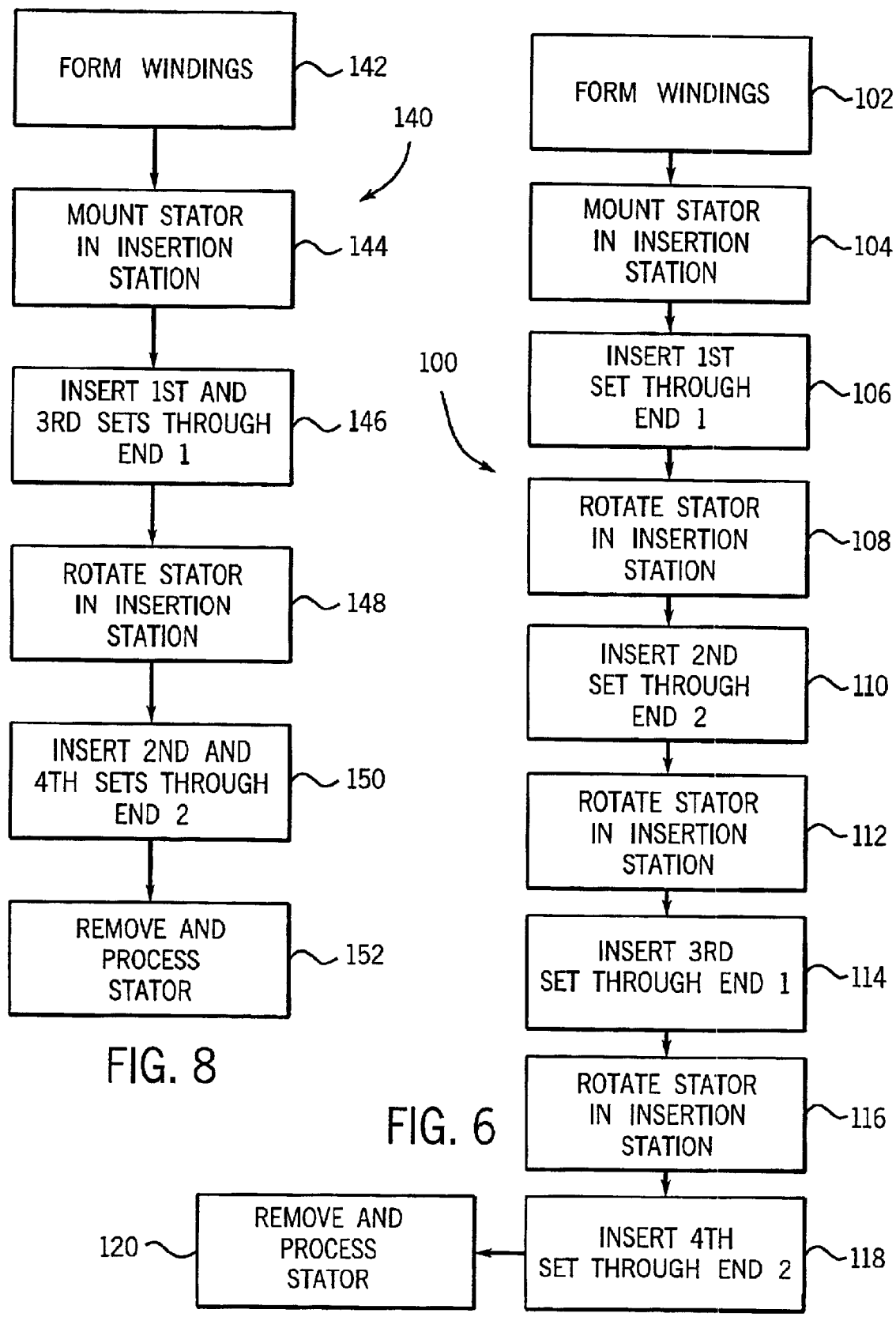

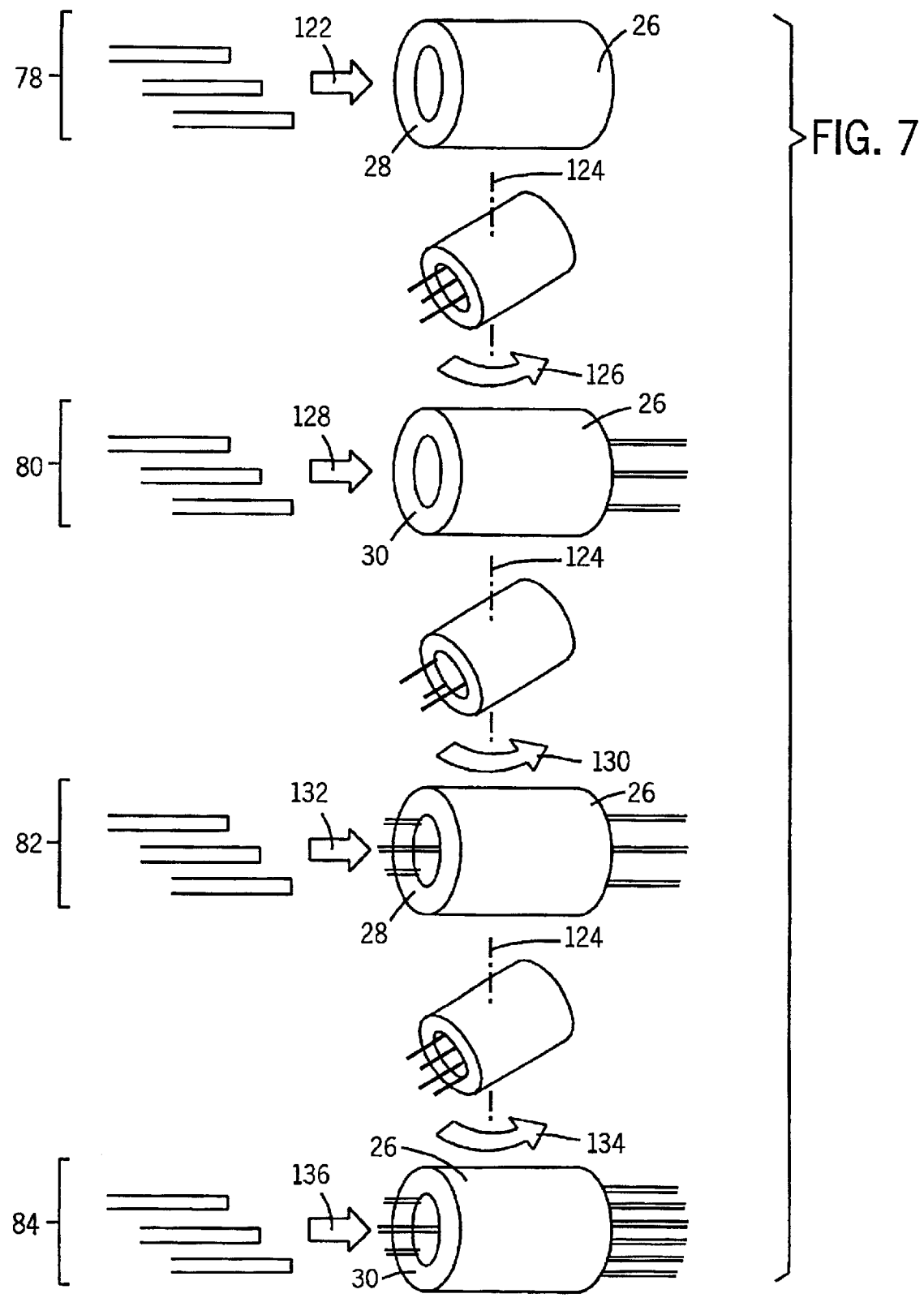

METHOD FOR MAKING AN ELECTRIC MOTOR STATOR

BACKGROUND OF THE INVENTION

The present invention relates generally to the field of electric motors and similar machines. More particularly, the invention relates to a novel technique for making a stator for an electric motor or similar machine.

In the field of electric motors, generators, dynamos, and similar machines, a wide variety of configurations have been proposed and are presently in use. Most such machines employ a stator which surrounds a rotor. The stator and rotor may have various designs and electrical configurations depending upon the type of application, the environment in which they are used, the available power, and other such factors. A common type of electrical motor, for example, is the induction motor used throughout industry and in many varied applications. Induction motors typically employ a stator including a core in which a plurality of windings are installed. Other types of electrical machines use somewhat similar stators, with rotor designs varying from permanent magnet rotors, wound rotors, brush and brushless rotors, and so forth.

In the field of stator design, many varied approaches have been proposed. For example, conventional stators are commonly manufactured based upon a core having a series of radially-disposed slots. The slots are designed to receive the stator coils. Each slot is typically insulated by a liner, and the coils are installed in the slots with leads exiting an end of the stator. The leads are interconnected in groups and channeled within the motor housing to an exit point for connection to a source of power.

The particular arrangement of coils within a stator defines the speed and electrical machine type. For example, coils in induction motors are wired together in groups to define poles. The synchronous speed of the motor is, then, defined by the number of poles and the frequency of the power applied to the stator. Moreover, the groupings of coils will define whether the machine is suitable for single-phase power or three-phase power. A corresponding number of slots is provided in the stator core to receive the desired number of coils for the particular motor configuration.

Even for motors having similar synchronous speeds, power ratings, and so forth, a wide variety of winding patterns are presently in use. The winding patterns may be grouped, generally, into classes including lapped designs and concentric designs. In lapped designs, one leg or side of a coil is installed in a base position in a slot, while the other leg or side of the coil is installed in a position over a different coil. The coils thus must "lap" over one another at ends of the stator core. In concentric designs, on the other hand, coils installed in a base position are placed in the base position for both legs or sides of the coil. Thus, certain coils can be fully installed prior to installation of coils which will overlie the installed coils. Thus, the coils do not lap, but are concentric to one another, at least within certain groups. Significant advantages flow from concentric coil designs. For example, the coils can be preformed and installed by specially-adapted machines. In lap designs, human operators typically install the coils within the stator core due to the complexity of installing coil legs in base and overlying positions within the stator core.

Despite the advantages of concentric winding designs, there is still significant need for improved designs. For example, existing stator designs typically provide for exiting leads of the stator windings from a single end of the stator core only. Where such leads become bulky, particularly where higher numbers of coil groups are employed or for higher power or voltage applications, the available space within the motor housing may significantly limit or even make impossible the installation of the coils. Larger motor frame sizes would thus be needed for particular power ratings due to the presence of the coil leads within the end bracket of the motor.

There is, at present, a significant need for an improved motor design based upon a concentric pattern which reduces the congestion at ends of the motor due to exiting leads. There is also a need for a technique for winding and making a motor stator which accommodates machine winding of concentric coils in such new patterns. There is a particular need for a method for making four-pole motor stator for use in applications requiring such motors, and, still more particularly, for three-phase rated four-pole motors having concentric winding patterns.

SUMMARY OF THE INVENTION

The present invention provides a novel technique for winding a motor stator and for building a motor based upon the stator designed to respond to such needs. The technique is based upon concentrically winding of the stator such that coils can be preformed and installed by machine. The technique may be used with a wide variety of stator core designs, including cores having 72 slots, 60 slots, 48 slots, and 30 slots. In each case, the number of coils per group will vary, as may the distribution of the coils within the core. In accordance with aspects of the present technique, certain slots receive a single coil, while other slots receive a pair of coils. In either case, however, the coils are concentric such that straightforward installation is afforded. The technique, in particular, provides a novel winding arrangement for a four-pole, three-phase motor having excellent performance characteristics while securing the benefits of concentric winding.

The technique is specifically adapted to improve the use of internal space within the motor by leads exiting both ends of the stator core. In a preferred arrangement, half of the leads exits a first end of the stator core, while a second half of the leads exits the opposite end. The coil groups may be installed through the first end and through the second end to provide the proper exiting of the coil leads. In a preferred process, the stator core receives a first set of coils through the first end, is rotated, and receives a second set of coils through the second end. Where desired, further rotation of the stator core is performed to install further sets of coils. In a present embodiment, the stator core is rotated three times, with four sets of coils being sequentially installed in the stator core. Because the stator core is rotated about its central axis (transverse to its longitudinal axis), the insertion of the coils does not entail any offset of the stator core or the insertion machinery.

BRIEF DESCRIPTION OF THE DRAWINGS

The foregoing and other advantages and features of the invention will become apparent upon reading the following detailed description and upon reference to the drawings in which:

FIG. 6 is a flow chart illustrating exemplary steps in a process for manufacturing the stator of FIGS. 4 and 5;

FIG. 7 is a diagrammatical representation of the processing steps and positions of the stator during the manufacturing process summarized in FIG. 6;

FIG. 8 is a flow chart illustrating exemplary steps in an alternative process for manufacturing a stator core of the type illustrated in FIGS. 4 and 5;

DETAILED DESCRIPTION OF SPECIFIC EMBODIMENTS

Figure 1:
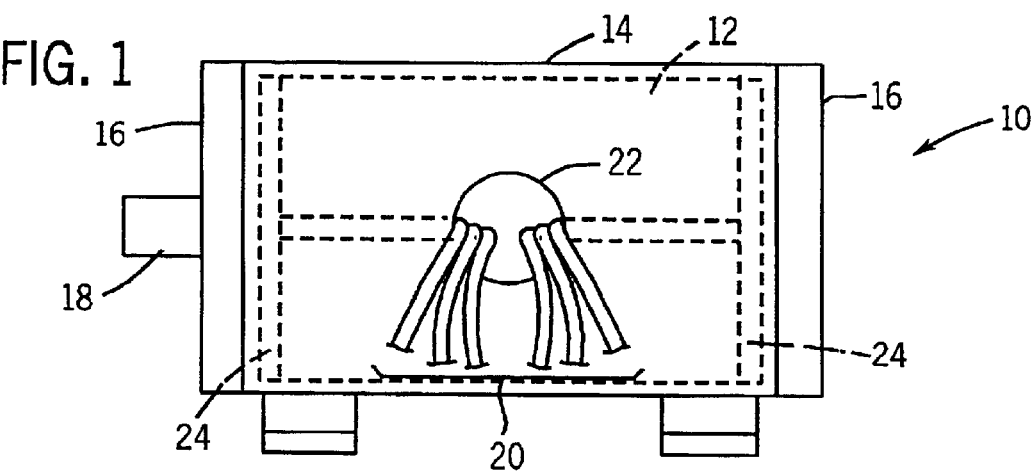
FIG. 1 is a diagrammatical representation of an electric motor including a stator configured in accordance with aspects of the present technique.

Turning now to the drawings and referring first to FIG. 1, a diagrammatical representation of an electric motor 10 including a stator constructed in accordance with the aspects of the present technique is illustrated. The motor 10 may be of any desired type, rating, and style. In present embodiments, motor 10 is an induction motor designed to operate on 3-phase alternating current. The specific voltage and current ratings of the motor may, of course, vary depending upon the application and design. The motor incorporates a stator 12 designed and constructed as described in greater detail below. Stator 12 is supported in a housing 14 which is closed on either end by an end bell or bracket 16. A shaft and rotating assembly, indicated generally at reference numeral 18, is supported within the stator 12 for rotation. Leads 20 from the stator 12 are channeled around ends of the stator in passageways 24 adjacent to end brackets 16. The leads exit the housing 14 at a passageway or conduit opening 22. In a final motor application, the opening 22 may be covered by a conduit box (not shown) for terminating the leads. It should be noted that, in addition to various voltage, power, current and other specifications, motor 10 may include any suitable housing style, including open, TEFC, drip-proof, explosion-proof, and so forth.

Figure 2:
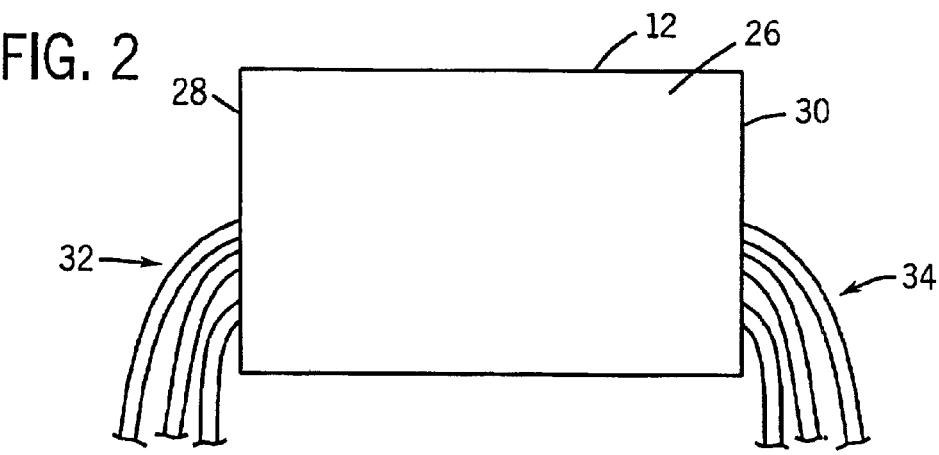
FIG. 2 is a diagrammatical representation of a stator of the type included in the motor of FIG. 1.

As illustrated generally in FIG. 2, stator 12 is fabricated as a separate assembly prior to mounting within housing 14 of the motor. The stator consists of a stator core 26 which is made of a ferromagnetic material, such as assembled steel laminate plates. The core 26 has two opposite axial ends 28 and 30. As described in greater detail below, sets of leads 32 and 34 of the coils within the stator core exit both ends, end 28 and end 30 respectively, to facilitate channeling of the leads within the motor housing and connection of the leads to form groups and poles.

The technique described herein for construction of motor 10 and stator 26 may be adapted for various motor configurations. However, the technique is particularly well-suited to construction of four-pole, three-phase motors. The technique described below is based upon a stator having 72 radial slots disposed about the interior of core 26. As will be appreciated by those skilled in the art, however, the technique may be adapted to stators having different numbers of slots, such as 60 slots, 48 slots, or 36 slots. In general, the technique permits machine installation of the stator windings such that leads 32 and 34 exit both ends 28 and 30 of the stator core. The windings or coils installed within the stator core are configured as concentric coils and may be installed through both ends of the stator core so as to facilitate exiting of the leads through the end by which the windings are installed. Exemplary processes for installation of the coils are described in greater detail below.

Figure 3:
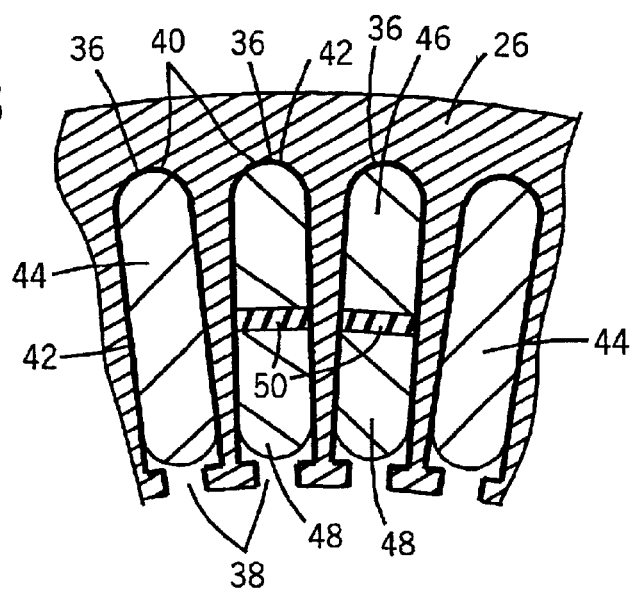
FIG. 3 is a sectional view through a portion of a stator core having coils both filling slots and shared with slots in accordance with aspects of the present technique.

FIG. 3 illustrates a partial section through stator core 26 with several coils installed. The coils are installed within slots 36 formed about the inner periphery of core 26. Each slot extends radially from an opening 38 at the inner periphery of core 26, to a base 40 located radially toward the outer periphery of the core. The slots extend axially between the ends of the stator core (see ends 28 and 30 in FIG. 2). A liner 42, which may be made of any conventional insulating and lining material, is wrapped around the inner wall of each slot 36. Individual coils, then, are installed within slots 36 through openings 38. As described in greater detail below, certain of the coils of the stator are installed singularly within the slots, while other coils are installed so as to share a slot with a coil of a different group. In a present embodiment, the coils which are installed singularly within the slots have a larger cross-sectional area than the coils intended to share slots. Thus, as illustrated in FIG. 3, certain coils 44 are positioned within individual slots, while other coils 46 and 48 are positioned together within individual slots. Where coils are positioned so as to share slots, an insulator 50 is provided between the coils. It should be noted that, as described more fully below, in the concentric winding technique described herein, where a coil is installed with a second coil in a shared slot, the coil is positioned either in a base position, as are coils 46 in FIG. 3, or in a top position, as are coils 48 in FIG. 3. A coil disposed in a base position in one slot will be disposed in a base position in another slot of the core. Similarly, a coil disposed in a top position of a shared slot will be positioned in a top position of a different shared slot of the core. Thus, machine installation of the coils is greatly facilitated by allowing coils to be fully installed (i.e., based-positioned coils) prior to installation of subsequent coils (i.e., top-positioned coils). Finally, it should be noted that the coils may be of any appropriate style and type, including solid conductor bars, conductor bundles or cables, and so forth.

Figure 4:
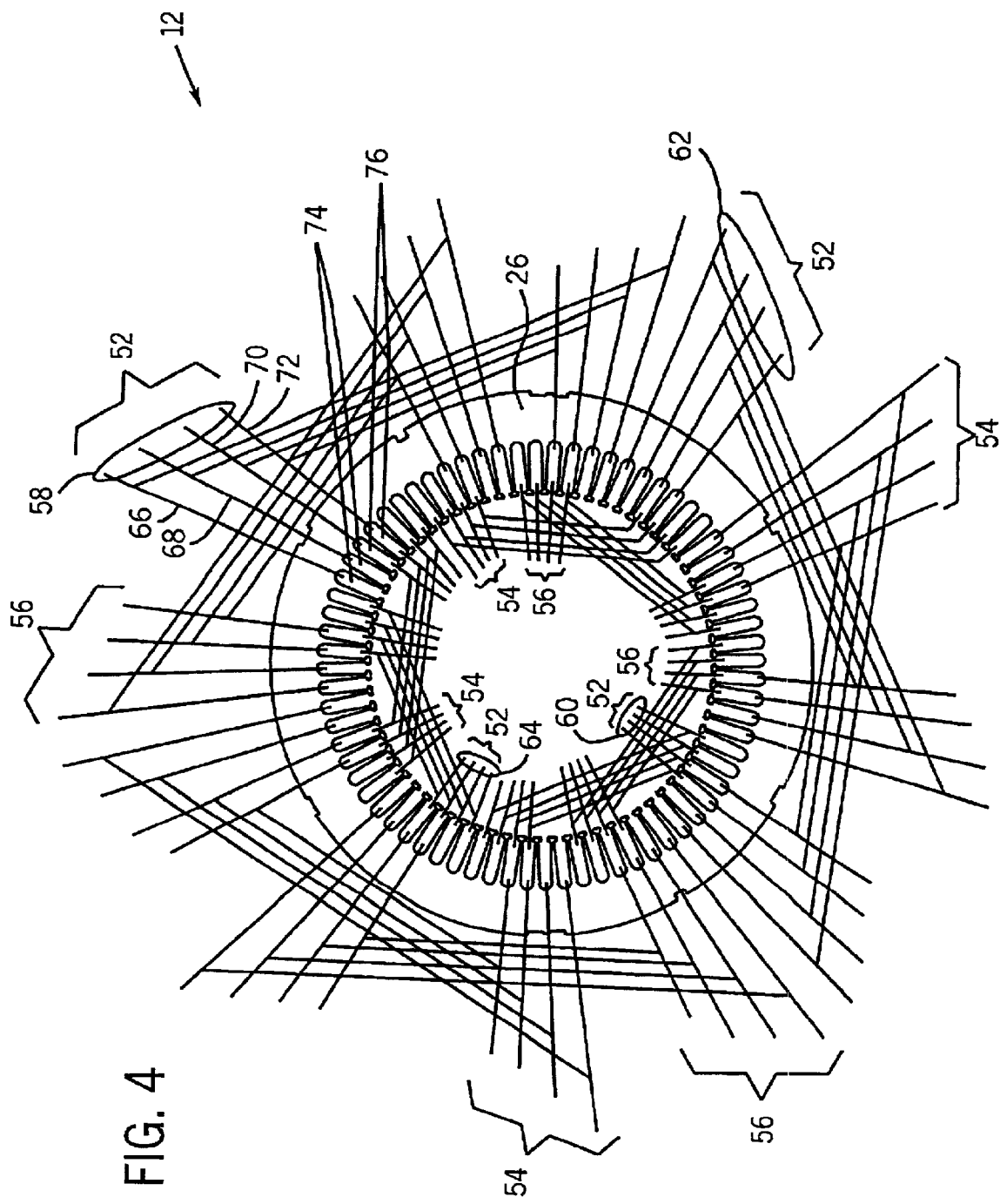
FIG. 4 is a diagrammatical representation of a 72-slot stator core wound in accordance with aspects of the present technique to provide concentric winding of a four-pole, three-phase motor.

As mentioned above, the windings or coils of the stator are installed so as to provide leads exiting both ends of the stator core. FIG. 4 is a schematic representation of the positioning and routing of the coils and leads in the stator core. As shown in FIG. 4, the stator core 26 in an exemplary embodiment includes 72 radially-disposed, axially-extending slots. Coils are installed within the stator core to define the poles, and groups of coils. As will be appreciated by those skilled in the art, the number of phases, poles and groups will depend upon the particular motor design. However, the number of poles, in the illustrated embodiment four poles, will define the synchronous speed of the motor in conjunction with the frequency of the alternating current applied to it. The present design may, of course, be used with conventional inverter drives, such that the speed may be regulated by regulation of the frequency of the applied current. The number of groups, and their interconnection, may be varied depending upon whether the coils are associated in wye or delta configurations.

The stator 12 illustrated in FIG. 4 includes coils for three phases, referred to herein as phases A, B and C. Moreover, the stator includes coils for four groups within each phase, thereby defining a three-pole machine. The groups are installed in four layers or sets, as described more fully below. Each group of coils includes four individual coils.

As shown in FIG. 4, phase A includes coils 52, while phase B includes coils 54 and phase C includes coils 56. Each phase includes four coils groups. Coils groups for phase A only are indicated separately in FIG. 4 for the sake of clarity. Thus, phase A includes groups 58, 60, 62 and 64. In the diagrammatical illustration of FIG. 4, the groups are illustrated as having four separate coils. Coils only for group 58 are indicated separately in FIG. 4 for the sake of clarity. Thus, group 58 includes coils 66, 68, 70 and 72.

Leads for the individual coils exit both ends of the stator core 26. In the embodiment illustrated in FIG. 4, for example, leads for groups 58 and 62 exit a first end of the stator core while leads of groups 60 and 64 exit in opposite end. In the illustration of FIG. 4, leads exiting a first end are illustrated radially outside the stator core, while leads exiting the opposite end or illustrated radially within the stator core. It will be noted that a certain of the coils shown in FIG. 4 are disposed singularly within the slots, while other coils share slots. Thus, coils 66 and 68 are positioned within non-shared slots 74, while coils 70 and 72 are positioned within shared slots 76 (sharing individual slots with coils of group 54 exiting an opposite end of the stator core).

Figure 5:
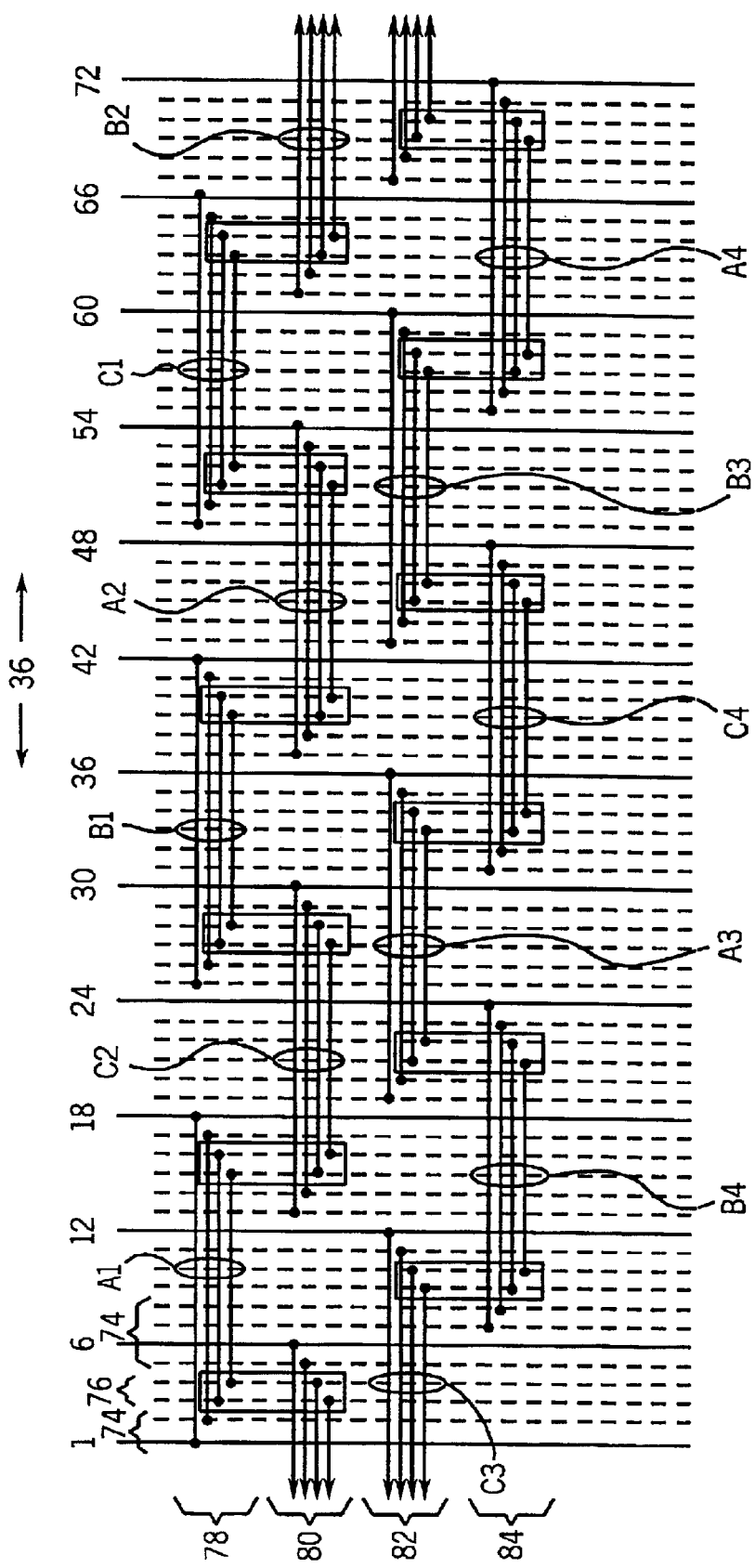
FIG. 5 is a diagrammatical representation of slot locations for the coils of the stator illustrated in FIG. 4.

The particular winding pattern illustrated in FIG. 4 is depicted diagrammatically in FIG. 5. As shown in FIG. 5, the stator core includes slots 36 extending about its inner periphery. In the illustrated embodiment, 72 such slots are provided. In the illustration of FIG. 5, individual coil groups are identified by the phase and group numbers. The horizontal lines and node points illustrated in FIG. 5 represent the span of each coil and the slots in which the coil sides or legs are disposed. Thus, for group A1, a first coil extends from slot 1 to slot 18, a second coil extends from slot 2 to slot 17, a third coil extends from slot 3 to slot 16, and a fourth coil extends from slot 4 to slot 15. It should be noted that these particular coils correspond to coils 66, 68, 70 and 72, respectively of FIG. 4. Similar illustrations are provided for all three phase A, B, and C, with numbers following the phase indication providing an identification of the coil group within the phase. As also illustrated in FIG. 5, certain coils will be positioned singularly within slots, as indicated by reference numeral 74. Other coils will share slots, as indicated by reference numeral 76. For the sake of clarity, rectangles have been shown in FIG. 5 surrounding coils that share slots within the stator core.

The coils illustrated in FIGS. 4 and 5 are installed such that leads of the coil exit opposite ends of the stator core. In particular, in the illustration of FIG. 5, layers or sets of coils are installed as indicated by reference numerals 78, 80, 82 and 84. In a present embodiment, sets 78 and 82 have leads that exit a first end of the stator core, while sets 80 and 84 have leads that exit an opposite end. As described more fully below, by installing sets 78 and 82 prior to sets 80 and 84, coils that share slots may be disposed within their respective slots, such that coils disposed within the base positions of the slots are fully installed prior to installation of coils disposed within a top position of the slots. Thus, in the illustration of FIG. 5, coils of group A1, installed with set 78, include coils disposed within slots 3 and 4. These coils will be installed within the base of their corresponding slots, and at base positions within slots 15 and 16. Upon installation of set 80, coils of groups B2 and C2 will be disposed in top positions over these coils, as indicated by the rectangles for slots 3 and 4, and slots 15 and 16. Thus, sets 78 and 82 can be fully installed in the core, followed by full installation of sets 80 and 84 to provide the winding pattern illustrated in FIG. 5.

This exemplary winding pattern for this exemplary embodiment, by group, may be summarized as indicated in Table 1 below:

TABLE 1

Winding spans

| Winding | Slot span | Lead exit end |
|---|---|---|
| A1 | 1–18 | 1 |
| B1 | 25–42 | 1 |
| C1 | 49–66 | 1 |
| A2 | 37–54 | 2 |
| B2 | 61–6 | 2 |
| C2 | 13–30 | 2 |
| A3 | 19–36 | 1 |
| B3 | 43–60 | 1 |
| C3 | 67–12 | 1 |
| A4 | 55–72 | 2 |
| B4 | 7–24 | 2 |
| C4 | 31–48 | 2 |

The exemplary winding pattern, by individual coil, may be summarized as indicated in Table 2 below:

TABLE 2

Slot/winding distribution

| Slot | Winding(s) |
|---|---|
| 1 | A1a |
| 2 | A1b |
| 3 | A1c/B2d |
| 4 | A1d/B2c |
| 5 | B2b |
| 6 | B2a |
| 7 | B4a |
| 8 | B4b |
| 9 | C3d/B4c |
| 10 | C3c/B4d |
| 11 | C3b |
| 12 | C3a |
| 13 | C2a |
| 14 | C2b |
| 15 | A1d/C2c |
| 16 | A1c/C2d |
| 17 | A1b |
| 18 | A1a |
| 19 | A3a |
| 20 | A3b |
| 21 | A3c/B4d |
| 22 | A3d/B4c |
| 23 | B4b |
| 24 | B4a |
| 25 | B1a |
| 26 | B1b |
| 27 | B1c/C2d |
| 28 | B1d/C2c |
| 29 | C2b |
| 30 | C2a |
| 31 | C4a |
| 32 | C4b |
| 33 | A3d/C4c |
| 34 | A3d/C4d |
| 35 | A3b |
| 36 | A3a |
| 37 | A2a |
| 38 | A2b |
| 39 | B1d/A2c |
| 40 | B1c/A2d |
| 41 | B1b |
| 42 | B1a |

TABLE 2-continued

Slot/winding distribution

| Slot | Winding(s) |
|---|---|
| 43 | B3a |
| 44 | B3b |
| 45 | B3c/C4d |
| 46 | B3d/C4c |
| 47 | C4b |
| 48 | C4a |
| 49 | C1a |
| 50 | C1b |
| 51 | C1c/A2d |
| 52 | C1d/A2c |
| 53 | A2b |
| 54 | A2a |
| 55 | A4a |
| 56 | A4b |
| 57 | B3d/A4c |
| 58 | B3c/A4d |
| 59 | B3b |
| 60 | B3a |
| 61 | B2a |
| 62 | B2b |
| 63 | C1d/B2c |
| 64 | C1c/B2d |
| 65 | C1b |
| 66 | C1a |
| 67 | C3a |
| 68 | C3b |
| 69 | C3c/A4d |
| 70 | C3d/A4c |
| 71 | A4b |
| 72 | A4a |

As will be appreciated by those skilled in the art, the number and disposition of the windings within the stator may vary depending upon the number of slots provided. For example, where fewer than 72 slots are provided, the individual groups may have fewer than four windings. Where such is the case, for example, in a stator having 60 slots, only a single coil in each group may be disposed in a shared slot. For stator cores having still fewer slots, such as cores having 36 slots, the groups may consist of only two coils, with a single coil being disposed in a shared slot and a coil being singularly located in a slot. Other adaptations in accordance with the present technique may be envisaged.

FIG. 6 represents steps in an exemplary process for installing coils in a stator of the type described above. This process, indicated generally by reference numeral 100, begins at step 102 wherein the coils or windings are formed. As discussed above, the coils may be formed of a single bar of conductive material, or may include multiple wraps of wire, or bundles of wire. Following formation of the coils, the stator core is mounted in an insertion station, as indicated at step 104. The insertion station maintains the core in a centralized position, and makes one end of the core accessible to an insertion tool. At step 106, a first set of coils is inserted into the core through a first end of the core.

The steps of FIG. 6 are illustrated diagrammatically in FIG. 7. As shown in FIG. 7, at step 106, the core 26, being held in an insertion station, is processed such that a first set of coil groups 78 (see, e.g., FIG. 5) is inserted through a first end 28 of the stator core. The insertion, as indicated at arrow 122 of FIG. 7, disposes all of the coils of the first set in their appropriate slots as described above. At step 108 of the process of FIG. 6, the stator core is rotated within the insertion station. Referring again to FIG. 7, following insertion of the coil group set 78, the core is turned as indicated by arrow 126. The core is preferably turned about a central vertical axis 124 such that there is no offset between the end 28 of the core and end 30 which is accessible following rotation of the core. At step 110 of the process of FIG. 6, then, a second set of coil groups is inserted through the second end of the core. In a diagrammatical representation of FIG. 7, arrow 128 represents insertion of set 80 which includes coils and groups illustrated diagrammatically in FIG. 5. As discussed above with reference to FIG. 5, the sets 80 inserted through end 30, in a present embodiment, partially overlie the coils of set 78 inserted previously through end 28. That is, certain of the coils of set 80 share slots and overly certain coils of set 78.

At step 112 in the process of FIG. 6, the stator core is again rotated in the insertion station. Again, this rotation, indicated by arrow 130 in FIG. 7, preferably occurs about the central horizontal axis 124 of the stator core so as to avoid offset between the ends of the stator core within the insertion station. Returning to FIG. 6, at step 114 the third set of coil groups is then inserted through the first end of the stator core. As shown in FIG. 7, and as indicated at arrow 138, the third set 82 of coil groups is inserted through end 28 such that the leads for these coils exits end 28, as do the leads for the set 78 inserted previously. At step 116 of FIG. 6, the stator core is again rotated in the insertion station, and at step 118 the fourth set of coil groups is inserted through the second end. As shown in FIG. 7, and as indicated at arrow 134, this rotation preferably occurs again about the central vertical axis 124, and the fourth set of coil groups 84 is inserted through the second end 30 as indicated by arrow 136. At this stage in the processing, leads for sets 78 and 82 of coil groups exit end 28 of the stator core, while leads for sets 80 and 84 of coil groups exit end 30 of the stator core. Following insertion of the fourth set of coil groups, the stator core is removed from the insertion station and further processed as indicated at step 120. As will be appreciated by those skilled in the art, such further processing would generally involve linking the coils into electrical groups, and terminating the coils. The stator is generally further processed by applying an insulating material, such as an acrylic resin, to the coils and core. Following final assembly of the stator, the stator is assembled in the motor housing with the remaining components of the motor in a conventional manner.

Figure 9:
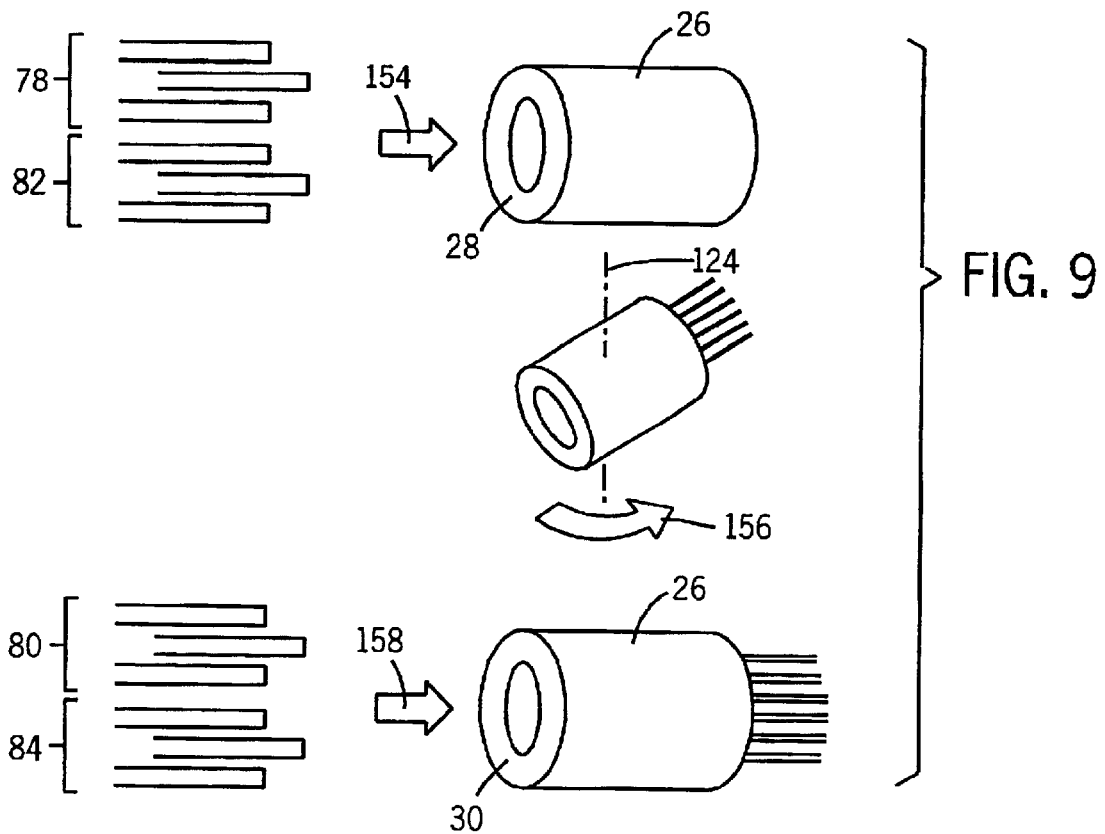
FIG. 9 is a diagrammatical representation of positions of the stator core during the process of FIG. 8.

Various adaptations and modifications of the foregoing process may be envisaged. For example, as shown in FIG. 8, in an alternative processing, the coil group sets inserted by repeated rotation of the core are inserted in two steps only. This process, identified generally by reference numeral 140, begins at step 142 where, again, the coils are first formed. At step 144, the stator core is mounted in an insertion station as in the preceding example. Referring to FIG. 9, in a diagrammatical representation, the stator core 26 is mounted in the insertion station such that a first end 28 is accessible to an insertion tool. At step 146 of FIG. 8, the first and third coil group sets are inserted through this first end of the stator core. As shown in FIG. 9, the sets 78 and 82 are inserted through end 28 as indicated at arrow 154. As noted above, the pattern of the coils and groups in accordance with the present technique facilitates insertion of both sets 78 and 82 without concern for overlying or underlying windings. That is, any coils of sets 78 and 82 which share slots may be inserted such that the windings lie in the base of their respective slots.

Figure 10:
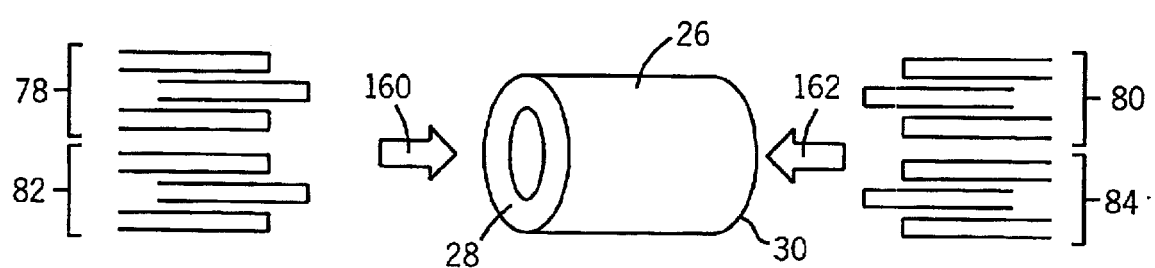
FIG. 10 is a diagrammatical representation of further alternative embodiment in which coils are installed without rotation of the core.

As indicated at step 148 in FIG. 8, the following insertion of the first and third sets of coil groups, the stator core is rotated in the insertion station. This rotation is indicated by arrow 156 in FIG. 9. As in the previous example, the rotation preferably occurs about a central vertical axis of the stator core to avoid offset between the ends of the core in the insertion station. At step 150 of FIG. 8, the second and fourth sets of coil groups are inserted through the second end of the stator core. As shown in FIG. 9, and as indicated at arrow 158, in this step sets 80 and 84 are insert through end 30 of the stator core. Again, by virtue of the winding pattern offered by the present technique, any coils of groups 80 and 84 sharing slots with coils of groups 78 and 82 may be fully inserted, as the former only overlie coils in shared slots of the previously inserted sets. Following insertion of the second and fourth sets of coil groups, the stator may be removed and further processed as indicated at step 152 in FIG. 8.

Where desired, further modification of the winding installation process may be implemented as indicated diagrammatically in FIG. 10. In this further modification, the stator core is mounted in an insertion station with ends 28 and 30 being accessible to different insertion tools or to an insertion tool which is capable of moving between the ends. Coil group sets 78 and 82 are then inserted through the first end 28 of the stator core as indicated by arrow 160 in FIG. 10. Again, all coils of these sets may be fully inserted as none of the coils underlie or overlie one another in their respective slots. Subsequently, coils of sets 80 and 84 may be inserted through end 30 as indicated by arrow 162 in FIG. 10. Again, any coils of sets 80 and 84 which share slots with coils of sets 78 and 82 will simply overlie those coils which have previously been inserted and installed in their respective slots.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for making a stator, the method comprising:
    installing a first set of concentric coil groups through a first end of a stator core, whereby leads of the first set of concentric coils exit the first end of the stator core;
    installing a second set of concentric coil groups through a second end of the stator core, whereby leads of the second set of concentric coils exit the second end of the stator core;
    installing a third set of concentric coil groups through the first end of the stator core, whereby leads of the third set of concentric coils exit the first end of the stator core; and
    installing a fourth set of concentric coil groups through the second end of the stator core, whereby leads of the fourth set of concentric coils exit the second end of the stator core.

2. The method of claim 1, wherein at least one coil of the third set of concentric coil groups is installed over a coil of the first set of concentric coils in a slot of the stator core.

3. The method of claim 2, wherein at least one coil of the fourth set of concentric coil groups is installed over a coil of the second set of concentric coils in a slot of the stator core.

4. The method of claim 1, wherein at least one coil of each coil group is installed in a respective stator slot with a coil of a different coil group.

5. The method of claim 4, wherein at least one coil of each coil group is installed singularly in a respective stator slot.

6. The method of claim 1, wherein the coil groups define a four-pole, three-phase stator.

7. The method of claim 1, wherein the coil groups are disposed in an order of A1, B4, C2, A3, B1, C4, A2, B3, C1, A4, B2, and C3, where A, B and C represent alternating current phases, and 1, 2, 3 and 4 represent coil groups of the first, second, third and fourth sets, respectively.

8. The method of claim 7, wherein the stator core includes 72 slots and each coil group includes 4 coils.

9. The method of claim 1, wherein the coil groups are installed in accordance with the following distribution:

| | |
|---|---|
| 1 | A1a |
| 2 | A1b |
| 3 | A1c/B2d |
| 4 | A1d/B2c |
| 5 | B2b |
| 6 | B2a |
| 7 | B4a |
| 8 | B4b |
| 9 | C3d/B4c |
| 10 | C3c/B4d |
| 11 | C3b |
| 12 | C3a |
| 13 | C2a |
| 14 | C2b |
| 15 | A1d/C2c |
| 16 | A1c/C2d |
| 17 | A1b |
| 18 | A1a |
| 19 | A3a |
| 20 | A3b |
| 21 | A3c/B4d |
| 22 | A3d/B4c |
| 23 | B4b |
| 24 | B4a |
| 25 | B1a |
| 26 | B1b |
| 27 | B1c/C2d |
| 28 | B1d/C2c |
| 29 | C2b |
| 30 | C2a |
| 31 | C4a |
| 32 | C4b |
| 33 | A3d/C4c |
| 34 | A3d/C4d |
| 35 | A3b |
| 36 | A3a |
| 37 | A2a |
| 38 | A2b |
| 39 | B1d/A2c |
| 40 | B1c/A2d |
| 41 | B1b |
| 42 | B1a |
| 43 | B3a |
| 44 | B3b |
| 45 | B3c/C4d |
| 46 | B3d/C4c |
| 47 | C4b |
| 48 | C4a |
| 49 | C1a |
| 50 | C1b |
| 51 | C1c/A2d |
| 52 | C1d/A2c |
| 53 | A2b |
| 54 | A2a |
| 55 | A4a |
| 56 | A4b |
| 57 | B3d/A4c |
| 58 | B3c/A4d |
| 59 | B3b |
| 60 | B3a |
| 61 | B2a |
| 62 | B2b |
| 63 | C1d/B2c |
| 64 | C1c/B2d |
| 65 | C1b |

-continued

| | |
|---|---|
| 66 | C1a |
| 67 | C3a |
| 68 | C3b |
| 69 | C3c/A4d |
| 70 | C3d/A4c |
| 71 | A4b |
| 72 | A4a, | wherein upper case letters A, B, and C indicate respective phases, digits 1, 2, 3 and 4 represent coil groups, and lower case leters a, b, c and d represent individual coils of each group.

10. The method of claim 1, wherein the stator core is rotated between each installation step.

11. A method for making a four-pole, three-phase stator, the method comprising:
installing a first set of concentric coil groups through a first end of a stator core, whereby leads of the first set of concentric coils exit the first end of the stator core;
rotating the stator core;
installing a second set of concentric coil groups through a second end of the stator core, whereby leads of the second set of concentric coils exit the second end of the stator core;
rotating the stator core;
installing a third set of concentric coil groups through the first end of the stator core, whereby leads of the third set of concentric coils exit the first end of the stator core;
rotating the stator core; and
installing a fourth set of concentric coil groups through the second end of the stator core, whereby leads of the fourth set of concentric coils exit the second end of the stator core.

12. The method of claim 11, wherein the stator core is rotated about a central vertical axis.

13. The method of claim 11, wherein at least one coil of each group of the second coil group set is installed over a coil of a group of the first coil group set in a respective slot of the stator core.

14. The method of claim 13, wherein at least one coil of each group of the fourth coil group set is installed over a coil of a group of the third coil group set in a respective slot of the stator core.

15. The method of claim 11, wherein at least one coil of each group is installed singularly within a respective slot of the stator core.

16. The method of claim 11, wherein the coil groups are disposed in an order of A1, B4, C2, A3, B1, C4, A2, B3, C1, A4, B2, and C3, where A, B and C represent alternating current phases, and 1, 2, 3 and 4 represent coil groups of the first, second, third and fourth sets, respectively.

17. The method of claim 11, wherein the stator core includes 72 slots and each coil group includes 4 coils.

18. The method of claim 11, wherein the coil groups are installed in accordance with the following distribution:

| | |
|---|---|
| 1 | A1a |
| 2 | A1b |
| 3 | A1c/B2d |
| 4 | A1d/B2c |
| 5 | B2b |

-continued

| | |
|---|---|
| 6 | B2a |
| 7 | B4a |
| 8 | B4b |
| 9 | C3d/B4c |
| 10 | C3c/B4d |
| 11 | C3b |
| 12 | C3a |
| 13 | C2a |
| 14 | C2b |
| 15 | A1d/C2c |
| 16 | A1c/C2d |
| 17 | A1b |
| 18 | A1a |
| 19 | A3a |
| 20 | A3b |
| 21 | A3c/B4d |
| 22 | A3d/B4c |
| 23 | B4b |
| 24 | B4a |
| 25 | B1a |
| 26 | B1b |
| 27 | B1c/C2d |
| 28 | B1d/C2c |
| 29 | C2b |
| 30 | C2a |
| 31 | C4a |
| 32 | C4b |
| 33 | A3d/C4c |
| 34 | A3d/C4d |
| 35 | A3b |
| 36 | A3a |
| 37 | A2a |
| 38 | A2b |
| 39 | B1d/A2c |
| 40 | B1c/A2d |
| 41 | B1b |
| 42 | B1a |
| 43 | B3a |
| 44 | B3b |
| 45 | B3c/C4d |
| 46 | B3d/C4c |
| 47 | C4b |
| 48 | C4a |
| 49 | C1a |
| 50 | C1b |
| 51 | C1c/A2d |
| 52 | C1d/A2c |
| 53 | A2b |
| 54 | A2a |
| 55 | A4a |
| 56 | A4b |
| 57 | B3d/A4c |
| 58 | B3c/A4d |
| 59 | B3b |
| 60 | B3a |
| 61 | B2a |
| 62 | B2b |
| 63 | C1d/B2c |
| 64 | C1c/B2d |
| 65 | C1b |
| 66 | C1a |
| 67 | C3a |
| 68 | C3b |
| 69 | C3c/A4d |
| 70 | C3d/A4c |
| 71 | A4b |
| 72 | A4a, | wherein upper case letters A, B, and C indicate respective phases, digits 1, 2, 3 and 4 represent coil groups, and lower case letters a, b, c and d represent individual coils of each group.

* * * * *